United States Patent [19]

Chau et al.

[11] Patent Number: 4,764,320
[45] Date of Patent: Aug. 16, 1988

[54] METHOD FOR PREPARING SEMIPERMEABLE MEMBRANE COMPOSITIONS

[75] Inventors: Chieh-Chun Chau; Lu H. Tung, both of Midland, Mich.

[73] Assignee: The Dow Chemical Company, Midland, Mich.

[21] Appl. No.: 60,871

[22] Filed: Jun. 12, 1987

[51] Int. Cl.⁴ .......................... B29C 55/12; C08J 9/36
[52] U.S. Cl. .......................................... 264/41; 55/16; 55/158; 210/500.4; 210/500.41; 264/22; 264/209.6; 264/211; 264/235.8; 264/288.8; 264/290.2; 264/343; 264/346; 521/61; 521/189
[58] Field of Search ................... 264/41, 343, 22, 211, 264/209.6, 288.8, 290.2, 235.8, 346; 521/61, 189; 55/16, 158; 210/500.4, 500.41

[56] References Cited

U.S. PATENT DOCUMENTS

| | | | |
|---|---|---|---|
| 3,534,528 | 10/1970 | Porter | 55/16 |
| 3,839,516 | 6/1971 | Williams et al. | 264/41 |
| 3,884,801 | 9/1973 | Kesting | 210/500 X |
| 4,130,403 | 12/1978 | Cooley et al. | 55/16 |
| 4,230,463 | 10/1980 | Henis et al. | 55/16 |
| 4,430,807 | 2/1984 | Davis et al. | 55/16 X |
| 4,561,654 | 12/1985 | Haza et al. | 273/63 B |

OTHER PUBLICATIONS

*Kirk–Othmer Encyclopedia of Chemical Technology*, Third Edition, vol. 15 "Membrane Technology", pp. 108–112.
*Encyclopedia of Polymer Science and Technology*, vol. 6, p. 764.

Primary Examiner—Philip Anderson
Attorney, Agent, or Firm—Matthew S. Goodwin

[57] ABSTRACT

Semipermeable membranes with improved permeation flux are prepared by contacting a glassy polymer in the form of a hollow fiber or film with a solvent in which the polymer swells at conditions which permit the swelling solvent to diffuse into the glassy polymer and then stretching the swollen polymer in an amount sufficient to cause visible stress whitening.

8 Claims, 1 Drawing Sheet

FIGURE 1 - PROCESS FLOW DIAGRAM

FIGURE 1 - PROCESS FLOW DIAGRAM
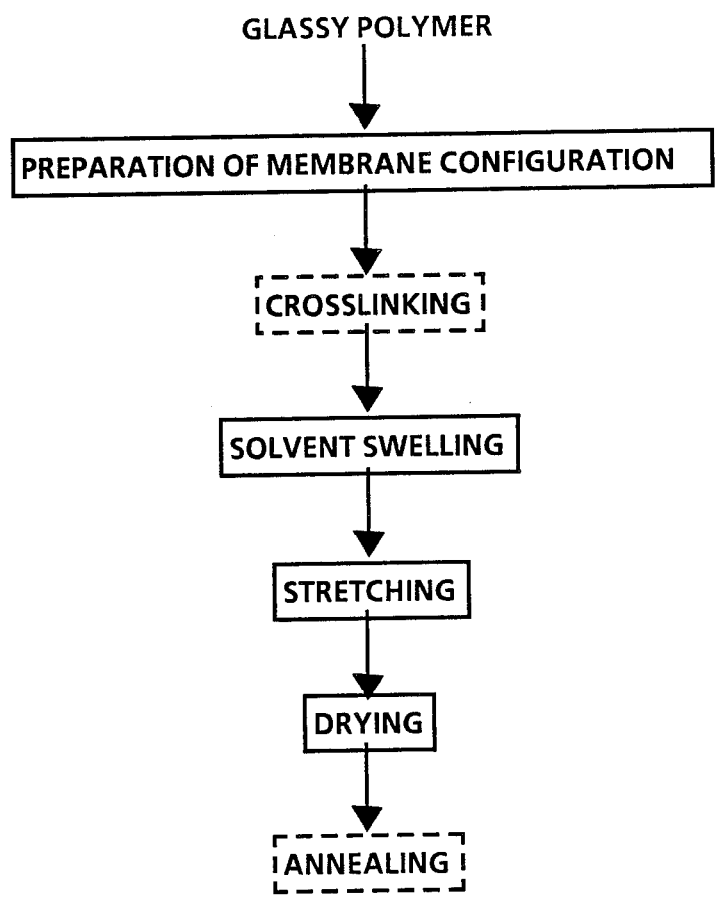

METHOD FOR PREPARING SEMIPERMEABLE MEMBRANE COMPOSITIONS

BACKGROUND OF THE INVENTION

The present invention relates to a method for preparing semipermeable membrane compositions for the separation of components from fluid mixtures or solutions.

Separation processes such as dialysis and reverse osmosis have been used in the separation of a wide variety of impurities and components from solutions. Membranes have been developed and used, for example, in the desalination of brackish and saline waters. Membranes have also been developed for the separation of gases. Membranes have been used for the separation of acid gases from methane, as described in U.S. Pat. Nos. 3,534,528; 4,130,403; and 4,561,654, or the separation of other gas mixtures, as described in U.S. Pat. No. 4,230,463.

The essential characteristics of semipermeable membranes can generally be defined in terms of relative permeability to the specific components to be separated, permeation flux for one of the components to be separated and mechanical strength of the membrane composition. The permeation flux is a measure of the rate at which one of the components to be separated permeates through the membrane. The relative permeability of the membrane is the ratio of the permeation fluxes of the components to be separated, often referred to as the separation factor or selectivity of the membrane.

A conventional technique for preparing semipermeable membrane compositions involves casting a polymeric solution to form a film on a surface and then completely evaporating the solvent. This method can produce semipermeable membranes which possess good physical strength and membrane characteristics, but the thickness of such homogeneous membranes causes an undesirably low permeation flux. Because the permeation flux is generally inversely proportional to the thickness of the membrane device, the membrane is advantageously as thin as possible. Unfortunately, extremely thin membrane structures prepared by conventional casting methods lack the desired selectivity and mechanical strength. They frequently contain discontinuities, small holes or other defects.

To correct the foregoing deficiencies, membrane compositions having a microporous structure for support and a dense layer for separation have been prepared by the so-called Loeb-Sourirajan method. This method produces asymmetric membranes which possess good physical strength and membrane characteristics. Known membrane compositions include cellulose ester membranes, which are typically employed in flat sheet or hollow fiber form. Unfortunately, the method involves process limitations which are difficult to control and, as noted in U.S. Pat. No. 4,430,807, can require special drying techniques if used for gas separation.

There have been numerous attempts to improve the membrane compositions and the processes for their preparation. Henis et al., *Science*, Vol. 20, page 11, 1983, disclose coating a gas separation membrane with silicone rubber in an attempt to plug flaws and defects present in the membrane. Unfortunately, such coated membranes normally exhibit permeation selectivities intermediate between that of the silicone rubber and the uncoated membrane. Delamination of the coating can also occur in the presence of condensed liquid hydrocarbons, as may occur under certain operating conditions.

In view of the deficiencies of the prior art, it would be highly desirable to provide a method for preparing semipermeable membrane compositions that exhibit increased permeation flux without sacrificing selectivity or mechanical strength.

SUMMARY OF THE INVENTION

The present invention is a method for preparing a semipermeable membrane composition. This method comprises the steps of contacting a glassy polymer in the form of a hollow fiber or film with a solvent in which the polymer swells at conditions which permit the swelling solvent to diffuse into the glassy polymer and cause the polymer to increase in at least one dimension by 5 percent; and then stretching the swollen polymer in at least one major direction in an amount sufficient to cause visible stress whitening. The semipermeable membrane compositions prepared by this method in preferred embodiments exhibit an increased permeation flux without sacrificing selectivity or mechanical strength.

This invention provides the skilled artisan with a method for making semipermeable membrane compositions which are useful in a wide variety applications. For example, the membranes of this invention are useful for gas and liquid separations and reverse osmosis.

DESCRIPTION OF THE DRAWING

FIGURE 1 is a schematic flow diagram of the process steps of this invention, which are fully described in the detailed description. Broken lines indicate optional steps.

DETAILED DESCRIPTION OF THE INVENTION

The transfer of permeate through the membrane device is believed controlled by a solution-diffusion mechanism, i.e., the components permeating through the membrane first dissolve into then diffuse through the membrane. The semipermeable membrane compositions of this invention do not contain interconnected pores that form a flow channel through which the transfer of permeate occurs. Such a porous, open-cell structure is often referred to as a "porous membrane" or "microporous membrane" and is not within the scope of this invention.

The physical structure of a polymer can range from one that is almost completely crystalline or semicrystalline to one that is completely amorphous. The charactertistics of an amorphous polymer will vary dependent upon whether the polymer is at a temperature above or below its glass transition temperature, $T_g$. At temperatures above $T_g$, the polymer is soft and rubbery. At temperatures below $T_g$, the polymer is hard and brittle.

A glassy polymer, as the term is used herein, is a homopolymer that is either completely amorphous or has an amorphous matrix containing a minor amount of crystalline domains. The degree of crystallinity should not exceed 20 weight percent of the polymer as measured by differential scanning calorimetry. A glassy polymer exists below its $T_g$ and therefore exhibits certain properties characteristic of those of a glass. It is normally a dense, transparent material that is nonporous. Examples of glassy polymers that are within the scope of this invention include the high performance thermoplastics such as polysulfone, polyethersulfone, polycarbonate, polymethylmethacrylate, polyarylate, and polyvinylchloride. The preferred glassy polymers are polycarbonate and polysulfone.

Glassy polymers can be treated in the manner of this invention in any of the conventional configurations which are operable for permselective applications. For example, the glassy polymer can be employed in the form of flat sheets or self-supporting films, hollow fibers, and tubular structures. A sheet or film can be prepared via a variety of conventional techniques which are disclosed in the *Encyclopedia of Polymer Science and Technology*. Vol. 6, page 764 (1967), including extrusion of an oriented layer or compression molding a layer of low orientation. Hollow fibers can be prepared by conventional hollow fiber spinning techniques. Tubular structures can be prepared by extrusion. Glassy polymers in the form of films with low orientation are preferred. Preferably, the film has a thickness ranging from about 20 micron ($\mu$m) to about 250 $\mu$m.

In one preferred embodiment of the invention, the glassy polymer is sufficiently crosslinked to increase the physical strength of the membrane composition without substantially limiting the permeation flux of the membrane composition. The degree of crosslinking which provides an increase in physical strength can vary over a considerable range depending upon the identity of the polymer, the polymer molecular weight and other factors. Preferably, the glassy polymer is crosslinked to a degree necessary to provide at least a five percent increase in tensile strength over the tensile strength of the untreated glassy polymer.

The glassy polymer can be crosslinked by a variety of techniques known in the art. Radiation sensitive polymers can be treated or modified with initiators, as necessary, and subjected to low amounts of ultraviolet (UV) or electron beam radiation to induce crosslinking. Crosslinks can also be provided by chemical reaction of groups attached to the polymer backbone. For example, polymers bearing groups having an active hydrogen atom, such as hydroxyl or primary or secondary amine moieties, can be crosslinked with a compound bearing an average of at least two isocyanate or acyl halide moieties.

A convenient means for irradiating the glassy polymer involves conveying the glassy polymer on a conveyor at a selected speed in the path of an electron beam. Preferably, at least one surface of the glassy polymer is substantially uniformly irradiated. The depth of penetration of radiation into the sample, the intensity of radiation and the exposure time can be controlled by varying the voltage of the electron beam, the beam current, and the line speed of the conveyor. The dosage provided to increase the physical strength of the membrane can readily be determined empirically.

The glassy polymer, which can be crosslinked to increase the physical strength of the membrane composition, is contacted with a solvent which causes the polymer to swell. The swelling solvents operable in this invention are those that will diffuse into the polymer and will cause the polymer to swell. The solubility parameter of the swelling solvent and the nature of the polymer must be such that the swelling solvent does not dissolve the polymer but does cause it to swell. The selection of the swelling solvent will depend on the difference between the solubility parameters of the solvent and the solubility parameter of the polymer and the degree to which the polymer is crosslinked. The selection of the swelling solvent can readily be determined empirically. Examples of solvents that can be employed with the glassy polymers of this invention include saturated aliphatic hydrocarbons having less than 10 carbon atoms, such as heptane, octane, and hexane; ketones having less than 10 carbon atoms, such as acetone and methyl ethyl ketone; alcohols having less than 10 carbon atoms, such as methanol and ethanol; and mixtures of the above.

The solvent can be applied simply by immersing the polymer in the solvent or by other conventional processing techniques, such as coating, dipping, dynamic solvent washing, jet spraying, and solvent vapor exposure. It is also possible to apply the solvent using a pressurized flow technique. For example, when the polymer is configured as a hollow fiber, solvent can be pumped through the fiber bore. The preferred method of contacting the solvent with the glassy polymer will depend on the configuration of the glassy polymer and the solvent employed.

The time required for the glassy polymer to remain in contact with the swelling solvent in order to obtain adequate swelling will depend upon the swelling power of the solvent. Of course, the swelling power of the solvent will depend on the solubility parameters of the solvent and polymer. It is also directly proportional to the temperature of the solvent. Generally, the degree of swelling necessary to effectively stretch the glassy polymer is that which will cause at least a 5 percent increase in the thickness of the glassy polymer.

After the swelling solvent diffuses into the glassy polymer and causes the polymer to swell, the polymer is stretched in at least one major direction until stress whitening is visible. The major direction is a direction parallel to a surface that contacts the feed stream when the treated polymer is disposed in a membrane device. For example, when the polymer is employed as a flat sheet or film, the major direction is a direction in the plane of the flat sheet or film. When the polymer is employed as a hollow fiber, the major direction is a direction parallel to the axis of the lumen.

Stress whitening is a change in the visual appearance of the glassy polymer. As the degree of stretching increases, the normally transparent polymer will become visibly opaque and white. The degree of stretching necessary to achieve the stress whitening effect will vary with the strength of the swollen polymer. It requires at least a 10 percent reduction in the transmission of visible light through the polymer as measured by transmission densitometry and can range from a 10 percent reduction in the thickness of the glassy polymer to a 95 percent reduction.

The stretching technique used in the method of this invention can be any known mechanical stretching method or any other method used to elongate the polymer. These include uniaxial, biaxial and multiaxial stretching and stretching under hydrostatic pressure.

The appearance of stress whitening is also affected by the stretching rate and solvent concentration. As the residual solvent concentration increases, the stretching rate required to cause the stress whitening effect increases. The stretching rate and the degree of stretching required to achieve an increase in flux without sacrificing selectivity or mechanical strength can be readily determined empirically.

After the glassy polymer is stretched in at least one direction to cause an apparent stress whitening affect, the polymer is released from the mechanical stretching means and the residual swelling solvent is removed from the resulting membrane. The swelling solvent can be removed by a variety of techniques. For example, the swelling solvent can be removed simply by allowing the finished membrane to dry in air, or if desired, the finished membrane can be vacuum dried. Alternatively, the membrane can be washed with volatile diluents and then dried in air or vacuum dried.

In a preferred embodiment of this invention, the semipermeable membrane composition prepared from the method of the invention can be further improved by annealing the membrane. The membrane can be annealed by subjecting the membrane to elevated temperatures for short time periods. If desired, the membrane can be constrained during the annealing process to prevent shrinkage. One method of constraining the membrane involves employing a suitable framing material, such as self adhesive aluminum foil, to frame the membrane. The annealing temperature can range from about 30° C to about 10° C. below the $T_g$ of the polymer for a time period ranging from about 30 seconds to about 30 minutes. Preferred annealing conditions will depend on the specific polymer, the degree of stretching and other factors. In preferred embodiments, the membrane composition is made less brittle and therefore less fragile by annealing. The annealing process may also improve the morphology of the finished membrane.

The semipermeable membrane compositions of this invention exhibit an increased permeation flux without sacrificing selectivity. Preferably, the flux is at least a twofold increase in the permeation rate of desired components through the membrane relative to the rate achieved by a glassy polymer prior to treatment. More preferably, the flux is at least a fivefold increase relative to the rate achieved by the untreated glassy polymer. The selectivity of a given membrane composition, which is defined herein as the ratio of permeation flux for oxygen to nitrogen, is at least about 90 percent of the selectivity achieved by the untreated glassy polymer. Surprisingly, the selectivity of a membrane composition may even increase after the processing techniques of this invention.

The configurations in which the semipermeable membrane compositions can be used include tubular devices, spiral wound devices, and hollow fiber membrane devices. A spiral wound device comprises a laminar sheet consisting of a plurality of membrane lamina separated by porous feed and permeate spacers wound around a central tube. A hollow fiber membrane or tubular membrane device is similar in configuration to a shell-and-tube heat exchanger and comprises a plurality of parallel membrane compositions in hollow fiber or tubular form embedded in at least one tube sheet. These devices are well known in the art and are generally described in Kirk-Othmer, *Encyclopedia of Chemical Technology*, 3rd Ed., Vol. 15, pp. 108–112, (1981).

The semipermeable membranes prepared from the process of this invention can be used in preferred embodiments to markedly increase the concentration of hydrogen and mixtures of hydrogen, nitrogen, methane, argon and ammonia typically resulting from the synthesis or ammonia. In addition, certain membranes can be used for the separation of hydrogen sulfide and carbon dioxide from natural gas, hydrogen from petrochemical process streams, oxygen from air and hydrogen from ammonia.

The following examples are presented to further illustrate but do not otherwise limit the scope of this invention. All parts and percentages are by weight unless otherwise indicated.

EXAMPLE 1

Two samples of transparent 3 inch × 3 inch 2.5 millimeter (mm) thick polycarbonate film sold by the General Electric Company under the tradmark Lexan 220 ® are immersed in a 30 percent acetone/70 percent heptane solvent mixture for 3 minutes. After the 3 minute period, the samples are allowed to dry in air for between 1 to 2 minutes. The samples are then hand-stretched biaxially with a pair of teflon wrapped metal clips. As the degree of stretching increases, the appearance of the samples turns from transparent to opaque. Stretching is continued until the thickness is reduced to 1 mm, and the samples are then dried in vacuum for 30 minutes. The finished samples appear to be white and opaque. The permeation flux of oxygen and nitrogen across each sample is determined by using a conventional gas permeation test apparatus. The permeability of the samples are compared to a control sample which is a sample of the untreated 2.5 ml thick polycarbonate film. The results appear in Table I.

TABLE 1

| Sample No. | Appearance | Thickness mils | $P_{O_2}^{(1)}$ | $P_{O_2}/P_{N_2}$ | $P_{O_2}$- Sample/ $P_{O_2}$- Control |
|---|---|---|---|---|---|
| 1 (control) | Transparent | 2.5 | $9.6 \times 10^{-9}$ | 5.0 | — |
| 2 | White opaque | 1.0 | $2.17 \times 10^{-8}$ | 5.95 | 2.26 |
| 3 | White opaque | 1.0 | $5.26 \times 10^{-8}$ | 5.47 | 5.5 |

[1] Permeation flux, cc(STP) · cm/cm2 · sec · atm measured at 23 ± 1° C.

The results indicate that the permeation flux of the treated samples is significantly greater than the permeation flux of the control sample. The results also indicate that the selectivity of the treated samples increased relative to that of the control sample.

EXAMPLE 2

A series of three samples of transparent polycarbonate film identical to the samples of Example 1 are immersed in a 30 percent acetone/70 percent heptane solvent mixture for 3 minutes. After the 3 minutes, the samples are allowed to dry in air for 1 minute. They are then mounted on a spherical stretcher. The spherical stretcher is composed of a finely polished 1.25 inch diameter teflon piston shaped with a hemispherical head. As the stretcher operates, the piston moves forward and pushes smoothly into the sample. The samples are stretched radially to a predesired thickness which is indicated by the travel of the piston. The samples are held in the stretched position for about 10 minutes before being removed from the stretcher. The samples appear white and opaque. They are allowed to dry in air for about 1 hour. The permeation flux of oxygen and nitrogen across the membrane is measured by using the same apparatus as the apparatus used in Example 1. The results appear in the following Table.

TABLE II

| Sample No. | Appearance | Thickness mils | $P_{O_2}^{(1)}$ | $P_{O_2}/P_{N_2}$ | $P_{O_2}$- Sample[2]/ $P_{O_2}$- Control |
|---|---|---|---|---|---|
| 4 | White opaque | 1.15 | $2.03 \times 10^{-8}$ | 5.12 | 2.12 |
| 5 | White opaque | 0.9 | $1.66 \times 10^{-8}$ | 5.29 | 1.73 |
| 6 | White opaque | 1.3 | $4.30 \times 10^{-8}$ | 5.29 | 4.48 |

[1] Permeation flux, cc(STP)·cm/cm²·sec·atm measured at 23 ± 1° C.
[2] The control sample is the same as that utilized in Example No. 1.

The treated samples show a clear improvement in permeation flux over the control sample without sacrificing selectivity. Surprisingly, the selectivity increases slightly for the treated samples over the selectivity of the control sample.

EXAMPLE 3

Two grams of polyarylate resin sold by Union Carbide Company under the trademark Ardel D-100 ® are dissolved in 15 ml of chloroform. A thin film of about 2 mm thickness is prepared from the solution by casting the solution into a film and drying. A 3 inch×3 inch sample is cut and immersed in a 50 percent acetone/50 percent heptane solvent mixture for 2.5 minutes. The sample is then dried in air for between about 1 to 2 minutes and handstretched biaxially using the same method as the method used in Example 1. The stretched sample appears white and opaque. The permeation flux of oxygen and nitrogen across the sample is determined and compared to an untreated control sample by using the same test apparatus as that employed in Example 1. The results appear in the following Table.

TABLE III

| Sample No. | Conditions | Appearance | Thickness mils | $P_{O_2}^{(1)}$ | $P_{O_2}/P_{N_2}$ | $P_{O_2}$- Sample/ $P_{O_2}$- Control |
|---|---|---|---|---|---|---|
| 7 | (Control) | Transparent | 2.4 | $1.01 \times 10^{-8}$ | 5.2 | 1 |
| 8 | 50% acetone/ 50% heptane, 3 min + hand stretch | Opaque White | 1.9 | $2.14 \times 10^{-7}$ | 4.8 | 21.2 |

[1] Permeation flux, cc(STP)·cm/cm²·sec·atm measured at 24.5° C.

The results indicate that the treated sample exhibits a substantial increase in the permeation flux over the flux obtained by the control sample without sacrificing the permeation selectivity.

What is claimed is:

1. A method for preparing semipermeable membrane compositions comprising the steps of
   (a) contacting a glassy polymer in the form of a hollow fiber or film with a solvent in which the polymer swells at conditions to permit the swelling solvent to diffuse into the glassy polymer and cause the polymer to increase in at least one dimension by 5 percent; and then
   (b) stretching the swollen polymer in at least one major direction in an amount sufficient to cause visible stress whitening.

2. The method of claim 1 wherein the glassy polymer is selected from the group consisting of polysulfone, polyethersulfone, polycarbonate, polymethylmethacrylate, polyarylate and polyvinylchloride.

3. The method of claim 2 wherein the glassy polymer is selected from the group consisting of polycarbonate and polysulfone.

4. The method of claim 1 wherein the glassy polymer is crosslinked to a degree effective to increase the tensile strength of the semipermeable membrane.

5. The method of claim 4 wherein the solvent is selected from the group consisting of saturated aliphatic hydrocarbons having less than 10 carbon atoms, ketones having less than 10 carbon atoms, alcohols having less than 10 carbon atoms, and mixtures thereof.

6. The method of claim 1 wherein the swelling solvent increases the thickness of the glassy polymer by at least 5 percent.

7. The method of claim 1 further comprising the step of annealing the finished membrane.

8. The process of claim 1 wherein the membrane exhibits at least a twofold increase in permeation flux relative to the flux exhibited by the glassy polymer prior to treatment while maintaining a ratio of permeation flux for oxygen to nitrogen of at least 90 percent of the ratio achieved by the glassy polymer prior to treatment.

* * * * *